Oct. 26, 1943.  W. R. TUCKER  2,332,678
METHOD OF MOLDING LARGE BODIES
Filed Jan. 2, 1940  2 Sheets-Sheet 1
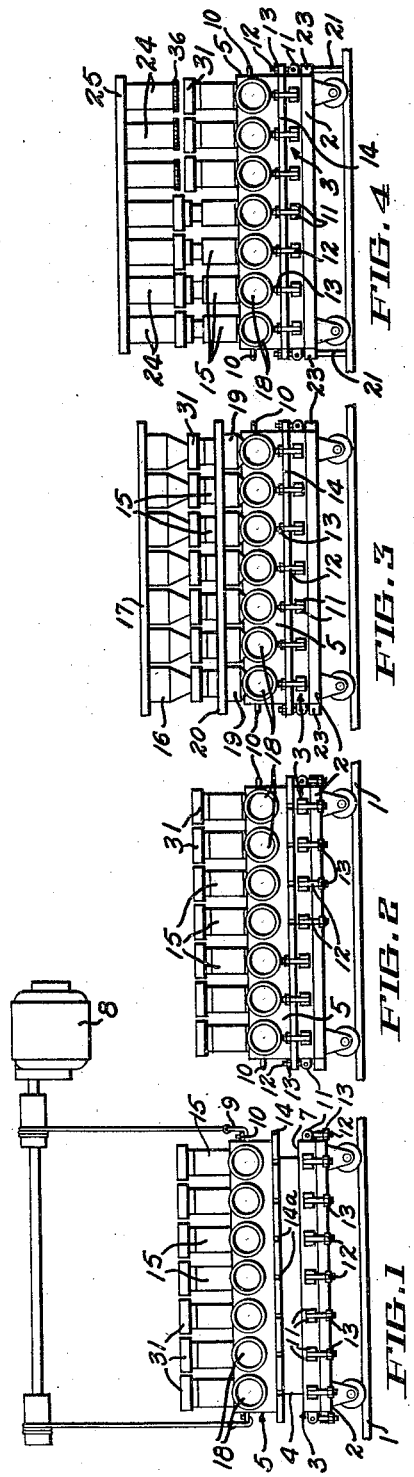
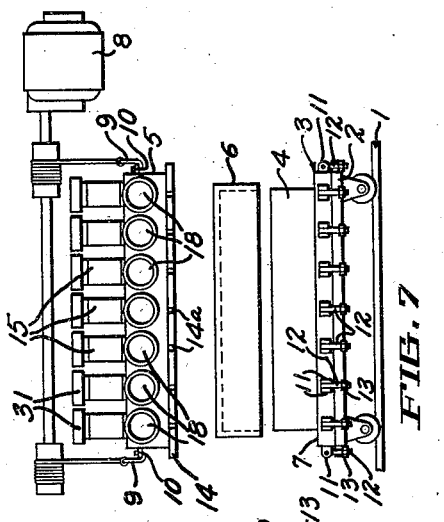
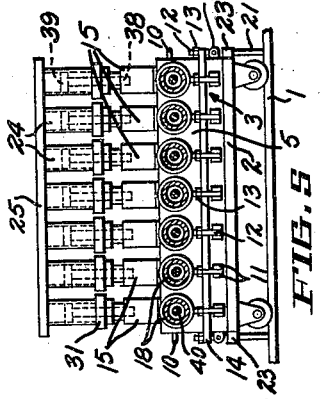
INVENTOR
WARREN R. TUCKER
BY Toulmin & Toulmin
ATTORNEYS Oct. 26, 1943.  W. R. TUCKER  2,332,678
METHOD OF MOLDING LARGE BODIES
Filed Jan. 2, 1940  2 Sheets-Sheet 2
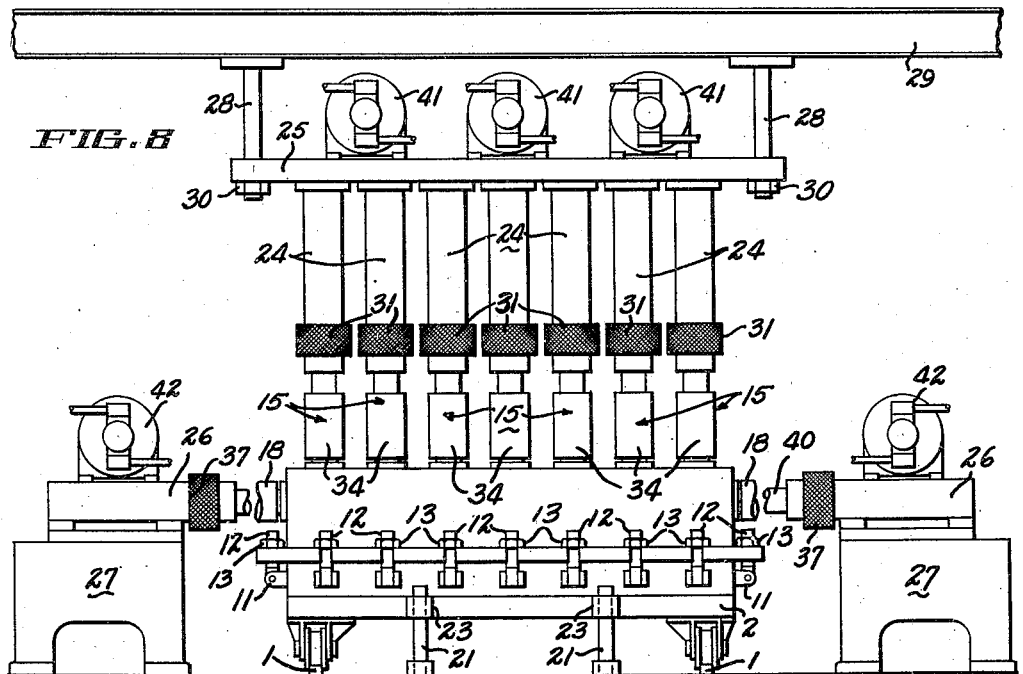
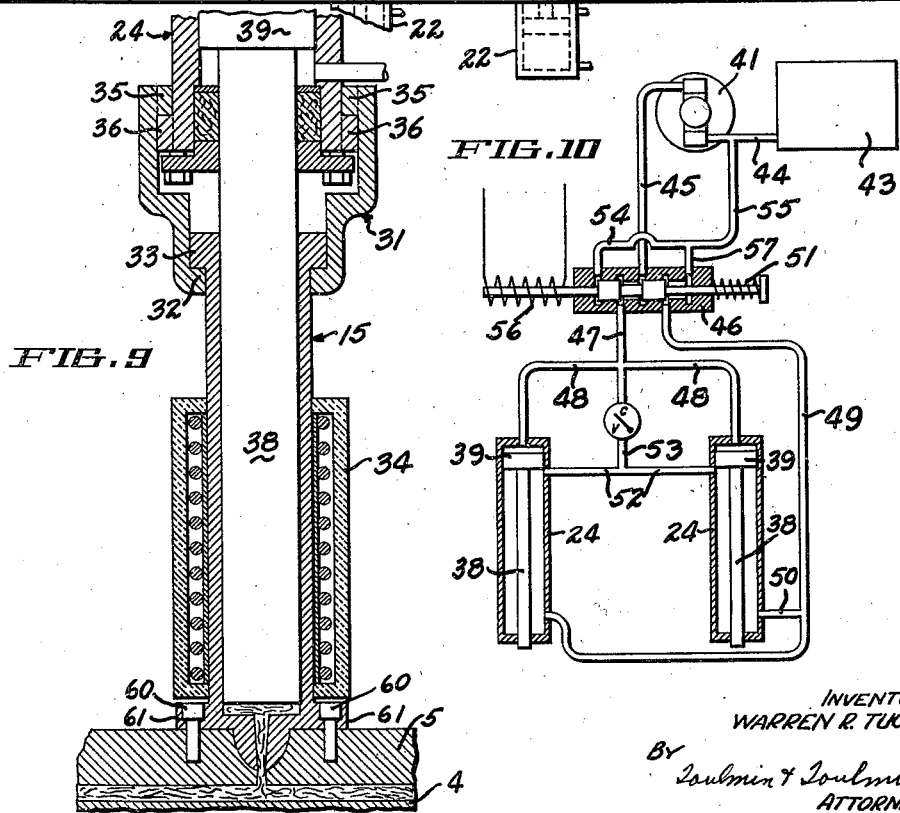
INVENTOR
WARREN R. TUCKER
By Toulmin & Toulmin
ATTORNEYS Patented Oct. 26, 1943

2,332,678

UNITED STATES PATENT OFFICE 2,332,678

METHOD OF MOLDING LARGE BODIES

Warren R. Tucker, Dayton, Ohio, assignor to The Hydraulic Development Corp. Inc., Wilmington, Del., a corporation of Delaware Application January 2, 1940, Serial No. 312,031

4 Claims. (Cl. 18—55)

This invention relates to a method for injection molding which, while applicable to and presenting advantages in the production of articles of small or moderate size, is particularly advantageous in the production of bodies of large size such as, for example, airplane wings or fuselages, coffins or caskets, automobile bodies, tops and fenders, table tops, and the like. Heretofore, in the injection molding art it has been customary to clamp the mold halves together by means of a press which may be mechanical but which is more commonly hydraulic. This clamping press is expensive to produce, to operate and to maintain. As the size of the molded article is increased, the size of the press required to clamp the mold halves together increases correspondingly and finally becomes so great that the cost of providing and operating it becomes prohibitive. It will be understood that it requires a tremendous volume of expensive pressure liquid to effect clamping of such extremely large mold halves. In addition, with previous designs, it would be impossible to satisfactorily mold extremely large bodies because of the impossibility of obtaining complete penetration of the injected plastic to all parts of the mold cavity. The present invention completely overcomes these difficulties and makes it possible to mold articles and especially large articles of the types discussed above rapidly, conveniently and inexpensively.

In accordance with the present invention, the clamping press for clamping the mold halves together and for unclamping them is eliminated, and the mold halves are clamped together by simple mechanical means which enables them to be clamped under extreme pressure which would require a clamping press of tremendous proportions to produce. The present invention involves in part the conception that by locking the mold halves together by means directly interconnecting them, the use of a clamping press with its attendant disadvantages and impracticability for use especially on extremely large mold halves, is rendered unnecessary. In this way, the economic limitations heretofore imposed on the size of injection molded articles are eliminated. Moreover, by application of the principles of the invention to the production of bodies of ordinary size, numerous advantages are attained over previous practice.

In order to obtain complete filling of the mold cavity, in accordance with the present invention, one or both of the mold halves is "studded" with closely spaced injection cylinders covering substantially the entire area of the mold cavity. By providing for substantially simultaneous injection from these injection cylinders, very rapid filling of the mold cavity results and the molded article is a unitary homogeneous structure.

In a preferred form of carrying out the invention, means is additionally provided for quickly locking each of the injection cylinders to its actuating hydraulic motor whereby the necessity for tie rods between the adjacent mold half or the injection cylinder and the hydraulic motor is eliminated, and likewise the necessity for an immovable supporting structure for immovably holding the hydraulic motors is eliminated.

It is preferred to carry out the molding by presenting the mold halves successively to a series of stations which may, if desired, be arranged in a circle and at each of which one or more operations in the molding process is performed. In this way, the carrying out of the invention is simplified and more rapid and convenient production of molded articles results.

From the foregoing, it will be seen that if the dies for the molded article are bolted together, no large press is required to clamp them, such as is now used in the injection molding industry. This allows an entire article such as for example an entire airplane body including the fuselage and wings, to be made in one piece and in one pass through the series of stations. The injection cylinders are suitably machined in one of the die halves or fixedly carried thereby in any other suitable manner. By having a multiplicity of these injection cylinders located at advantageous points, as much material can be injected into the die as is desired and complete filling of the die cavity is insured. After the shot has been completed and has cooled, the die halves are unbolted and the piece is removed. The injection machine comprises a multiplicity of hydraulic cylinders and their controls mounted so as to bring them and the injection plungers carried by the hydraulic pistons operating in the hydraulic cylinders into alignment with the injection cylinders carried on the die half. Thus, a commercially feasible method is provided for the molding of very large plastic pieces where plastics present an advantage in physical properties over the materials used in such articles heretofore.

The general principles of the invention may be applied to the die casting of metal articles, if desired, the apparatus being suitably modified so as to accommodate molten die casting metals and alloys.

It is an object, therefore, of the present invention to provide for the simplification and reduction in cost of the production of injection molded articles.

Another object is to provide for the elimination of a clamping press for clamping the die halves together and for unclamping the same; this is preferably accomplished by providing for manual or automatic bolting of the die halves to one another, the bolting means extending across the parting line of the die halves.

Another object is to provide a multiplicity of injection cylinders over the area of the die cavity whereby greater uniformity and speed of injection is realized and whereby the production of a unitary article free from weakening lines is insured.

Another object is to provide for clamping of each of the injection cylinders to the hydraulic motor associated therewith in a simple and convenient manner whereby the hydraulic motors are firmly locked against movement away from the injection cylinders during injection and at the same time the injection cylinders are adapted to be fixedly carried by the mold half whereby the provision of the production line referred to above is facilitated, the mold half carrying the injection cylinders being moved into position below or adjacent the hydraulic motors as it progresses in its path through the series of stations.

Still other objects and advantages of the present invention will more fully hereinafter appear and be apparent to those skilled in the art as the following description of one embodiment of the present invention proceeds.

In the accompanying drawings;

Fig. 1 is a view showing the upper die half carrying the injection cylinders being lowered into place over the lower die half which has been wheeled thereunder.

Fig. 2 is a view showing the die halves wheeled to the next station and having their locking bolts applied so as to lock them together.

Fig. 3 shows the locked die halves at the filling station, hoppers having been placed into association with the injection cylinders mounted on the upper die half whereby to fill the same preparatory to the injection operation.

Fig. 4 shows the assembly wheeled below or in line with the hydraulic motors carrying the injection plungers and adapted to actuate the injection plungers so as to cause injection; in this view a portion of the injection cylinders have been locked to the hydraulic motors therefor.

Fig. 5 shows the assembly at the same station as in Fig. 4 but during injection of the plastic from the injection cylinders into the mold cavity.

Fig. 6 shows the die halves still locked but after injection, the injection cylinders having been unlocked from the hydraulic motors and the assembly having been wheeled to the next station after the injecting station of Figs. 4 and 5; at this station, unlocking of the die halves proceeds.

Fig. 7 is a view showing the assembly having returned to the station of Fig. 1 and having the upper die half lifted away from the lower die half. The molded article is shown as being lifted away from the lower die half; if desired, the station of Fig. 7 may be separate from the station of Fig. 1.

Fig. 8 is a detailed end view of the die halves at the injecting station.

Fig. 9 is a detailed vertical section through one of the injection cylinders and a portion of the hydraulic motor connected thereto and shows in detail the clamping means for clamping these elements to one another. The view also shows a portion of the die halves and the die cavity.

Fig. 10 is a diagrammatic view showing a hydraulic circuit whereby the actuation of a pair of hydraulic motors by a single hydraulic pump is effected.

Referring to the drawings in detail, I designates a pair of rails or tracks which are fixedly mounted in any suitable manner on the floor and upon which a truck or carriage 2 is adapted to roll, this truck 2 having suitable wheels adapted to support it on the tracks I. In this way, truck 2 may be successively moved from one station to the next. Carried upon the truck 2 in any suitable manner is the lower mold half 3 which has the upwardly projecting male portion 4 and which is designed to cooperate with the upper mold half 5 in the production of a hollow box shown at 6 in Fig. 7. To this end, the mold half 3 has an outwardly extending flange 7 which is adapted to support the upper mold half 5 as it is lowered into position thereover. The upper mold half 5 is supported and is lowered and raised by the hoisting motor 8 which is adapted to support or lower the hooks 9. These hooks 9 are adapted to engage with ears 10 fixedly carried on the mold half 5. In this way, the mold half 5 is adapted to be supported so as to allow the truck 2 carrying the mold half 3 to be moved thereunder, and thereafter to be lowered into position upon the mold half 3 by the motor 8, hooks 9 being disengaged from the ears 10 after this lowering operation.

In order to provide for bolting the mold halves 3 and 5 together so as to prevent separation during the injection, the flange 7 of the mold half 3 is provided on its side and end faces with a plurality of pairs of ears 11 which pivotally support locking bolts 12. The locking bolts 12 carry on their ends the threaded nuts 13. The upper mold half 5 is provided with an integral outwardly extending flange 14 which is recessed inwardly at points 14a in line with the locking bolts 12 whereby the locking bolts 12 can be swung up from the position shown at the right of Fig. 2 into the position shown at the left thereof, whereupon the nuts 12 are tightened downwardly, thereby firmly locking the mold halves together. It will be understood that the nuts 12 need be turned only a very small amount in order to effect this locking since it is necessary to have nuts 13 backed off only sufficiently to allow them to be received above the flange 14. For example, the locking may be effected by turning the nuts 13 only through a half revolution with respect to the locking bolts 12.

As illustrated, the upper mold half 5 fixedly carries in any suitable manner and at closely spaced intervals over its top the vertical injection cylinders 15 and along its sides the horizontal injection cylinders 16. In Fig. 9, injection cylinder 15 is illustrated as being fixedly attached to mold half 5 by cap screws 60 passing through the flange 61 formed on the lower end of the injection cylinder 15. While in the drawings the ends of the mold are not provided with horizontal injection cylinders corresponding to 16, it will be obvious that these ends may be provided with such cylinders. The construction of these cylinders will presently be described in greater detail.

After the hooks 9 have been unhooked from the mold half 5, the truck 2 is wheeled to the locking station of Fig. 2 where the locking of the mold halves together is shown in progress.

After the locking has been completed as in Fig. 2, the truck 2 is wheeled to the charging station of Fig. 3 where charging of the injection cylinders 15 with granular plastic is effected by means of the hoppers 16 which are carried by any suitable support 17 and which are placed in position over the injection cylinders and allowed to discharge their contents by gravity into the injection cylinders. The injection cylinders 18 are likewise being filled by hoppers 19 which are indicated diagrammatically and the contents of which obviously flow downwardly and then horizontally so as to fill the side cylinders 18. Hoppers 19 are supported and carried as a unit by the support 20.

After the injection cylinders have been charged at the station in Fig. 3, the hoppers 16 and 19 are removed and the mold assembly is wheeled to the injecting station shown in Figs. 4 and 5, the mold assembly being accurately positioned with reference to the injecting mechanism by means of the studs or plungers 21 which are projected upwardly through the floor by the hydraulic motors 22 through the locating ears fixedly carried by the truck 2. The injecting station comprises a plurality of downwardly extending hydraulic motors 24 designed to align with the injection cylinders 15 and supported by a support 25. Hydraulic motors 24 are equal in number to the injection cylinders 15. The injection station also comprises a plurality of horizontally disposed hydraulic motors 26 which are in alignment with the side injection cylinders 18 when the mold assembly is positioned by the locating studs 21. The hydraulic motors 26 are supported by the supports 27 parallel to the mold assembly. A support 25 for the vertical hydraulic motors 24 is carried by the depending bolts 28 mounted on the cross beam 29. The nuts 30 threadedly and fixedly mounted on the bolts 28 prevent the support 25 from moving downwardly thereby. Thus the hydraulic motors 24 are prevented from moving downwardly but are free if necessary to move upwardly although this upward movement is commonly not necessary.

In order to lock the hydraulic motors 24 to the injection cylinders 15 so as to prevent the hydraulic motors 24 from pulling away from the injection cylinders during injection, a knurled locking member 31 is providing for each injection cylinder 15, this locking member 31 being free to rotate relative to the injection cylinder barrel 15 by reason of the cooperation of the retaining flange 32 with the annular shoulder 33 on injection cylinder 15 (see Fig. 9). The heating jacket 34 prevents the locking member 31 from dropping all of the way down cylinder 15. The locking collar 31 is adapted to engage the lower end of the hydraulic motor 24 by a suitable bayonet type connection. As shown, this connection comprises the inwardly extending teeth 35 on the locking collar 31, these teeth 35 being adapted to enter between cooperating teeth 36 which extend outwardly from the lower end of the cylinder of hydraulic motor 24. Thus by elevating the collar 31 and rotating it so as to place the teeth 35 behind and above teeth 36, the cylinder of the hydraulic motor 24 is firmly locked to the injection cylinder 15 and is thus prevented from moving upwardly during the injection under the reactive force accompanying the injection. The injection cylinders 18 are locked to the horizontal hydraulic motors 26 by the knurled locking collars 37 in the same manner. As shown in Fig. 4, the assembly is in the process of having its injection cylinders locked to the hydraulic motors. In Fig. 8, there is shown the same assembly but with the locking of the injection cylinders to the hydraulic motors completed.

The mechanism is now ready for injection. The injection from the injection cylinders 15 is accomplished by the injection plungers 38 carried by the hydraulic piston 39 operating within the cylinder of the hydraulic motor 24. The injection from the side injection cylinders 18 into the mold cavity is accomplished by the injection plungers 40 operated by the hydraulic motors 26. As shown in Fig. 5, the assembly is still at the injecting station and the injection plungers are being simultaneously moved inwardly within their injection cylinders so as to cause injection of the plastic which has been converted to fluent form by the heating elements 34 associated with each of the injection cylinders. Fig. 8 likewise shows that the injection plungers are being moved inwardly to cause injection, but only the side injection plungers 40 are visible in that figure. In Fig. 9, the injection plunger is illustrated as having substantially reached the end of its stroke and having filled the mold cavity formed between mold half 5 and the mold member 4.

The actuation of the injection plungers is effected by the hydraulic pumps, those associated with hydraulic motors 24 being designated as 41 and those operating the horizontal hydraulic motors 26 being designated as 42. These pumps 41 and 42 are connected to the hydraulic motors 24 and 26 in any suitable manner so as to move the injection plungers inwardly or outwardly as desired, suitable controls being provided for controlling the actuation of the injection plungers under the influence of the liquid pressure output of the pumps 41 and 42.

After the injection has been accomplished as in Fig. 5, the hydraulic controls are manipulated so as to cause the retraction of the injection plungers, whereupon the injection cylinders are unlocked from the hydraulic motors. The mold assembly is now free to be moved from the station of Figs. 4 and 5 to the cooling station shown in Fig. 6 where the mold assembly is allowed to stand for a sufficient period of time to cause cooling and solidification of the molded article so that it will retain its shape.

The mold locking bolts 12 may be unlocked at the station shown in Fig. 6, or the mold assembly may be first moved to the final station shown in Fig. 7 where this unlocking of the mold halves may be accomplished. As shown in Fig. 7, the locking bolts 12 have been manipulated so as to unlock the mold halves 3 and 5, and the hooks 9 have been inserted in the ears 10 of the upper mold half 5 which has been elevated by means of the hoisting motor 8 into the position shown in Fig. 7 in which it is free from mold half 3 and from the molded article 6. As further indicated in Fig. 7, a molded box-like article 6 has been lifted upwardly from around the mold member 4. The molding cycle is now complete and is ready for repetition.

As indicated above, the final station shown in Fig. 7 is the same as the initial station shown in Fig. 1, the truck 2 having made a closed circuit. It will be obvious that if desired the final station shown in Fig. 7 may be at the end of the circuit and the hoisting means shown in Fig. 7 different from hoisting means shown in Fig. 1, the elevated mold half 5 being returned to the station of Fig. 1 in any suitable manner after cleaning or other operation thereupon.

The hydraulic circuit shown in Fig. 10 is illustrative of the type of control which may be applied so as to actuate a plurality of hydraulic motors 24 from a single hydraulic pump 41. The pump 41 draws liquid from the tank 43 through the conduit 44 and discharges it into the conduit 45. The conduit 45 is the inlet conduit of the casing of a control valve 46 which is adapted to direct the incoming pressure liquid either to a conduit 47 which leads to the top of the motive pistons 39 by the branching conduits 48, or to the conduit 49 which leads by the branching conduits 50 to the bottom of the cylinders of the hydraulic motors 24. The valve member in the control valve 46 is normally held rightwardly by the spring 51 so that it causes liquid under pressure to be delivered below the motive piston 39 and thus normally holds the injection plungers retracted, the arrangement being such that the motive pistons 39 uncover the ports of the branching conduits 52 leading by a check valved conduit 53 to the conduit 47 and thence through the valve 46 and a branch conduit 54 to a return conduit 55. In order to actuate the injection plungers in an injection stroke, means is provided for shifting the valve member of the valve 46 leftwardly, this means being shown as a solenoid coil 56 operating upon the valve member of the valve 46 so as to move it leftwardly and cause the incoming pressure liquid from conduit 45 to be transmitted to conduit 47 and thence through the branched conduits 48 to the spaces above the pistons 39 thereby forcing the injection plungers 48 downwardly in an injection stroke. As this occurs, the liquid below pistons 39 is returned by way of conduits 50, conduit 49, the valve 46, and a branch conduit 57 into the return conduit 55. The valve 46 thus acts automatically to compensate for the difference in volume on the opposite sides of the pistons 39. The arrangement of the conduits 52 and the check valve conduit 53 is such as to normally maintain the injection plungers in their retracted position, since as soon as the pistons 39 uncover the ports of conduits 52, the return is allowed to take place therethrough and further rise of the pistons 39 is prevented, thereby preventing damage to the upper portion of the hydraulic motors 24. It will be understood that the pump 41 is a one-way pump. Obviously, if desired a reversible variable delivery pump with proper control may be substituted for one-way constant delivery pump 41.

From the foregoing description, it will be seen that the present invention provides a simple and economical method for the production of injection molded articles and more especially for the production of such articles without limitation upon the size thereof. It will further be seen that the present invention greatly simplifies the injection molding machinery by eliminating the expensive hydraulic press commonly employed to hold the mold halves together. As will be obvious, it is possible by means of the direct locking bolts 12 to lock the mold halves together with an enormous force which would be wholly impossible to attain with anything except the most gigantic clamping press, since the locking bolts 12 positively lock the mold halves together against separation even though enormous forces be exerted by the plastic being injected. The limiting factors of the elongation of the locking bolts 12 and the liability of breakage thereof are practically negligible and are readily overcome by merely designing the locking bolts so as to be large enough to resist the separating forces. By providing a great number of locking bolts, these limitations may be further overcome. If desired, suitable means may be provided for positioning a plurality of the locking bolts 12 and for tightening a plurality of the nuts 13 thereon in a single operation. While such means is not shown, its design will be readily apparent to anyone skilled in the art.

It will further be seen that by the provision of a great number of individual but simultaneously operated injection units substantially uniformly distributed over the area of the molded piece, the injection is made extremely rapid, undue injection pressures are not required and the resulting article is entirely without lines of demarcation since the plastic material from several injection units does not solidify in the mold until after it has been intimately commingled in the fluent state by the injecting pressure. It will also be seen that the provision of stations at which the several steps in the process are carried out and the provision of means for detachably applying charging hoppers and injection mechanism makes for a rapid and highly efficient production.

By providing the mold itself with fixedly attached injection cylinders, the weight of the mold is not unduly increased as it would be were the hydraulic injecting motors also permanently attached to the mold. At the same time, the mechanism is simplified. If the injection cylinders were not carried by the mold, it would be necessary at the injecting station to provide auxiliary hydraulic motors or other means for temporarily clamping the injection cylinders to the mold. Thus, it is necessary to provide only the hydraulic injecting motors and no other hydraulic motors are necessary, the present invention providing manual and direct clamping and unclamping of the mold halves, permanent attachment of the injection cylinders to one of the mold halves, and manual and direct locking of the injection cylinders to the hydraulic injecting motors. The invention further provides for the manual charging of the injection cylinders thereby further simplifying the mechanism. At the same time, the invention is particularly adapted to the production line for rapid and efficient manufacture.

I wish it to be understood that I intend to include as within this invention such modifications thereof as are obvious to those skilled in the art and as fall within the terms or spirit of the appended claims. Instead of the means indicated diagrammatically for charging the side injection cylinders 18, any other suitable means may be employed. For example, these cylinders might be charged from their open outward ends by a suitable discharge conduit or cylinder applied thereto and adapted to charge granular plastic forwardly in these cylinders and if desired pack it therein. Instead of the means shown for locking the injection cylinders to the hydraulic injecting motors, other means may be employed, such as tie rods extending between outward flanges on the top of the injection cylinder and the bottom of the cylinder of the injecting motor. If desired, such tie rods might be readily detachable and constructed similarly to the mold locking bolts 14.

Having thus fully described my invention, what I claim as new and desire to secure by Letters Patent is:

1. A method of injection molding large articles of plastic material which comprises bringing a lower mold half to one station, lowering a completely detached upper mold half having a plurality of injection cylinders secured thereto onto said lower mold half and locking the two halves together to form a complete mold, moving the thus formed mold to a loading station, loading said cylinders with molding material at said loading station, moving said mold and loaded cylinders from said loading station to an injection station, coupling a plurality of hydraulic motors having injection plungers thereon to said injection cylinders, with the plungers in alignment with the bores of said cylinders at said injection station, actuating said motors to force said plungers into said injection cylinders and force the material therefrom into the mold, uncoupling said motors from said cylinders and moving said cylinders and mold from said injection station to an article removing station, unlocking the two mold halves and raising the upper mold half away from the lower mold half and removing the article from one of said mold halves.

2. A method of injection molding large articles of plastic material which comprises moving a truck supported lower mold half to one station, lowering a completely detached upper mold half having a plurality of injection cylinders secured thereto onto said lower mold half and locking the two halves together to form a complete mold, moving the thus formed mold to a loading station, loading said cylinders with molding material at said loading station, moving said mold and loaded cylinders from said loading station to an injection station, coupling a plurality of hydraulic motors having injection plungers thereon to said injection cylinders, with the plungers in alignment with the bores of said cylinders at said injection station, actuating said motors to force said plungers into said injection cylinders and inject the material therefrom into the mold, uncoupling said motors from said cylinders and moving said cylinders and mold from said injection station to an article removing station, unlocking the two mold halves and raising the upper mold half away from the lower mold half and removing the article from one of said mold halves.

3. A method of injection molding large articles of plastic material which comprises bringing a lower mold half having a plurality of locking bolts with nuts threaded thereon pivotally attached to said lower mold section to one station, lowering a completely detached upper mold half having a plurality of injection cylinders secured thereto and having a flange extending therearound onto said lower mold half and tightening said nuts on said flange to thereby lock the two halves together by attaching said bolts to said flange to form a complete mold, moving the thus formed mold to a loading station, loading said cylinders with molding material at said loading station, moving said mold and loaded cylinders from said loading station to an injection station, coupling a plurality of hydraulic motors having injection plungers thereon to said injection cylinders, with the plungers in alignment with the bores of said cylinders at said injection station, actuating said motors to force said plungers into said injection cylinders and inject the material therefrom into the mold, uncoupling said motors from said cylinders and moving said cylinders and mold from said injection station to an article removing station, unlocking the two mold halves and raising the upper mold half away from the lower mold half and removing the article from one of said mold halves.

4. A method of injection molding large articles of plastic material which comprises bringing a lower mold half to one station, lowering a completely detached upper mold half having a plurality of injection cylinders secured thereto onto said lower mold half and locking the two halves together at a plurality of separated points of the two mold halves to form a complete mold, moving the thus formed mold to a loading station, loading said cylinders with molding material at said loading station, moving said mold and loaded cylinders from said loading station to an injection station, coupling a plurality of hydraulic motors having injection plungers thereon to said injection cylinders, with the plungers in alignment with the bores of said cylinders at said injection station, actuating said motors to force said plungers into said injection cylinders and inject the material therefrom into the mold, uncoupling said motors from said cylinders and moving said cylinders and mold from said injection station to an article removing station, unlocking the two mold halves and raising the upper mold half away from the lower mold half and removing the article from one of said mold halves.

WARREN R. TUCKER.